United States Patent

Pullen et al.

[11] Patent Number: 6,124,366
[45] Date of Patent: Sep. 26, 2000

[54] FLUID FORMULATION AND METHOD FOR DUST CONTROL AND WETTING ENHANCEMENT

[75] Inventors: Erroll M. Pullen; Melvyn D. Pullen, both of Wilmington, N.C.; Carol Pullen, Abingdon, Va.

[73] Assignee: Nalco Chemical Company, Naperville, Ill.

[21] Appl. No.: 08/673,420

[22] Filed: Jun. 28, 1996

[51] Int. Cl.[7] .................................................. C09K 3/22
[52] U.S. Cl. .......................... 516/198; 252/88.1; 427/212
[58] Field of Search ................... 252/88.1, 351, 252/353; 427/212, 201; 516/198

[56] References Cited

U.S. PATENT DOCUMENTS

| | | | |
|---|---|---|---|
| 4,428,984 | 1/1984 | Shimizu et al. | 427/220 |
| 4,737,305 | 4/1988 | Dohner | 252/88.1 |
| 4,801,635 | 1/1989 | Zinkan et al. | 524/156 |
| 5,302,308 | 4/1994 | Roe | 252/88.1 |
| 5,330,671 | 7/1994 | Pullen et al. | 252/88.1 |
| 5,399,282 | 3/1995 | Hansen et al. | 252/88.2 |
| 5,527,482 | 6/1996 | Pullen et al. | 252/88.1 |

FOREIGN PATENT DOCUMENTS 2279962  1/1995  United Kingdom.

*Primary Examiner*—Jacqueline V Howard
*Assistant Examiner*—Cephia D. Toomer
*Attorney, Agent, or Firm*—Fulbright & Jaworski, L.L.P.

[57] ABSTRACT

An aqueous fluid useful for the suppresion of dust and the enhancement of the wetting characteristics of a surface is described. The fluid comprises surfactants and at least one high terpene content natural oil. Methods are described for the suppresion of dust and the enhancement of wetting of a surface.

34 Claims, 1 Drawing Sheet

FLUID FORMULATION AND METHOD FOR DUST CONTROL AND WETTING ENHANCEMENT

BACKGROUND OF THE INVENTION

The invention relates to aqueous, dust suppression fluids, and formulations for the abatement of dust containing water dosed with dust suppression fluids. Furthermore, the invention relates to methods for the abatement of dust. In addition, the invention relates to methods of use of aqueous, dust suppression fluids for the enhancement of wetting and water retention by surfaces treated with said dust suppression fluids.

Dust suppression is the reduction of the extent to which finely divided solid particulate material becomes suspended in the air. A variety of materials such as coal, sulfur, phosphate, clay, and other finely divided ores and minerals, generate dust in transfer and handling operations during mining, transportation, storage, and use. Wetting enhancement is intended to mean increasing the rate at which aqueous solutions penetrate the surfaces to which they are applied. Water retention is reducing the rate at which water is evaporated from a material.

Dust is a particularly severe safety and health hazard in coal mining, handling, and storage operations. Coal often chips into small fragments by the action of wind and rain, frictional movement due to motion in transit, and abrasion in handling. Respirable coal dust has a particle size of less than about 10 microns and its inhalation can lead to pneumoconiosis, i.e., "black lung disease". Also, dust explosions due to spontaneous combustion may occur when the dust is confined to a small air space such as in coal mining operations. Dust is also an important health and safety concern in other types of mining, as well as in many types of construction. Dust from the dirt of non-finished (i.e. not covered in asphalt or concrete) road surfaces that are frequently present in mining and construction sites can make operation of heavy equipment dangerous due to limited visibility. Dust also causes an increase in maintenance requirements of machinery in order to prevent excessive wear and tear.

It is known to suppress coal dust in mines by spraying with various aqueous systems containing chemical additives to improve working conditions and reduce the toxicological risks and explosion hazards. For example, U.S. Pat. No. 4,425,252 describes a method to abate coal dust using an anionic surfactant, preferably sodium dodecyl benzene sulphonate and a nonionic surfactant, preferably a polyethoxylated nonylphenol, in an aqueous formulation. The method comprises spraying the coal dusty area with a formulation comprising water containing up to 0.1% by weight of the mixture of the anionic surfactant, i.e., a water soluble salt of an alkyl aryl sulfonic acid and nonionic surfactant having an HLB of from 10 to 16. Optimally, the mixture contains one or more cosolvents generally of the class of alkylene glycol monoalkyl ethers, $C_2$ to $C_5$ alkanols and mixtures thereof.

Furthermore, several techniques have been developed utilizing foamable compositions for suppressing coal dust. For example, U.S. Pat. No. 4,551,261 describes a foam comprising water, a foaming agent, and an elastomeric water insoluble polymer. A variety of anionic and nonionic surfactants and detergent wetting agents are described as useful foaming agents and a variety of elastomeric and water insoluble synthetic organic polymer binders are described as useful elastomeric water insoluble polymers.

U.S. Pat. No. 4,971,720 describes a method for suppressing dust process emissions. The method utilizes a foaming agent which may be a low salt tolerant surfactant selected from salts of fatty acids, alkyl sulphates, and alkyl aryl sulphonates.

U.S. Pat. No. 4,561,905 describes a coal dust suppression mixture of oil, water and a surfactant in the form of an emulsion that is diluted and foamed. The foam is then sprayed into a falling mass of coal. The oils suitable for use are described as heavy process oils and include asphalt dissolved in a moderately heavy oil, residual flush oils or relatively high viscosity fuel oil. The preferred oil have a viscosity in the range of from approximately 600 to 7,000 SUS at 38° C., a pour point in the range of approximately −18° to 21° C., a molecular weight of at least 300 and a boiling point of at least 204° C.

Thus, various techniques have been developed to suppress coal dust, and many of the techniques are effective for reducing that dust. However, there is still a need for improvement in coal dust suppression, and many of the prior techniques were developed without addressing problems found in with modern mining and construction environments. The materials and techniques of the prior art suffer from several disadvantages. They are not easy to use, as they require complicated and expensive equipment. The materials used are not readily biodegradable, thus they present a possible hazard due to accumulation to toxic levels. The materials may be toxic even at low levels. As the materials are leached out of the surface to which they are applied, they present a potential hazard to aquatic life forms.

SUMMARY OF THE INVENTION

Accordingly, it is the primary object of the invention to prove an effective, novel dust suppression and wetting fluid, which also effectively addresses certain problems associated with modem mining and construction practices. For example, most modem, state-of-the-art, continuous coal mines utilize scrubbers which tend to clog. Thus, there is a need for a material which not only effectively reduces airborne dust, but also effectively assist in keeping spray nozzles and scrubber screens clean and unclogged. In addition, dust suppression fluids often have secondary uses and are frequently circulated through mine equipment underground as a heat exchange fluid. However, water jackets on that equipment tend to accumulate mineral deposits such as calcium deposits, drastically reducing cooling efficiency. Hence, it is a further object of the invention to provide a dust suppression fluid which increases cooling efficiency when used as a heat exchange fluid by maintaining the water jackets on the equipment underground free of mineral deposits such as calcium deposits.

Many of the chemical additives used in dust suppression fluids are also very expensive. It is, therefore, another object of the invention to provide a dust suppression fluid which reduces the need for costly chemical additives. Furthermore, many of the chemicals used in dust suppression are themselves toxic to humans to some degree, and destructive of the environment. Thus, another object of the invention is to provide a dust suppressing fluid which is less toxic to humans and is environmentally acceptable thereby reduces process water contamination; water which ultimately will find its way to local streams, rivers and lakes.

Another problem associated with the prior art is the vast amount of process water which is necessary for coal dust suppression. While process water is dosed with various aqueous solutions containing chemical additives to assist in dust reduction, the amount of actual process water used remains very high. It is thus even another object of the invention to provide a dust suppression fluid which actually reduces the amount of process water needed for dust suppression.

The aforementioned and other objects of the invention can be obtained by the invention. The invention provides a novel, aqueous, dust suppression fluid comprising one or more surfactants and at least one high terpene-containing natural oil. Another aspect of the invention relates to a formulation for the abatement of dust comprising water dosed with the aforementioned aqueous dust suppression fluid. Another aspect of the invention relates to a method for the abatement dust using the formulation. A further aspect of the invention is to provide a method for enhancing the wetting characteristics of a surface thereby increasing the rate of water uptake by that surface. An even further aspect of the invention is to provide a formulation that increase the water retention of a surface to which it is applied.

The novel dust suppression fluid of the invention is very effective for suppressing airborne dust when used in a formulation for the abatement of dust. Furthermore, the fluid can effectively assist in keeping spray nozzles and scrubber screens clean and unclogged. In addition, the dust suppression fluid can increase cooling efficiency when used as a heat exchange fluid by continuously clearing mineral deposits such as calcium deposits from water jackets on the underground equipment. Also, the dust suppression fluid can reduce the need for costly chemical additives, and can provide a dust suppression fluid that is less toxic to humans and is environmentally acceptable. When process water is dosed with the dust suppression fluid of the invention, it has also been found that the fluid can actually reduce the amount of process water needed for dust suppression.

The novel formulation of the present invention is useful in improving the wetting characteristics of a surface. The present formulation is appropriate for use on any surface that needs: a) further wetting; b) better and deeper penetration by a wetting solution; and c) improved water retention by the treated surface. It is expected that the present invention will find application in many areas, including but not limited to, mine haulage roads, quarry haulage roads and storage areas, temporary roads (i.e. during road repairs), non-blacktop race tracks, utility coal dumps and golf courses. The non-toxic nature of the present invention makes it particularly appropriate for surfaces that receive foot traffic such as golf courses and trails.

DETAILED DESCRIPTION OF THE PREFERRED EMBODIMENTS

Figure 1:
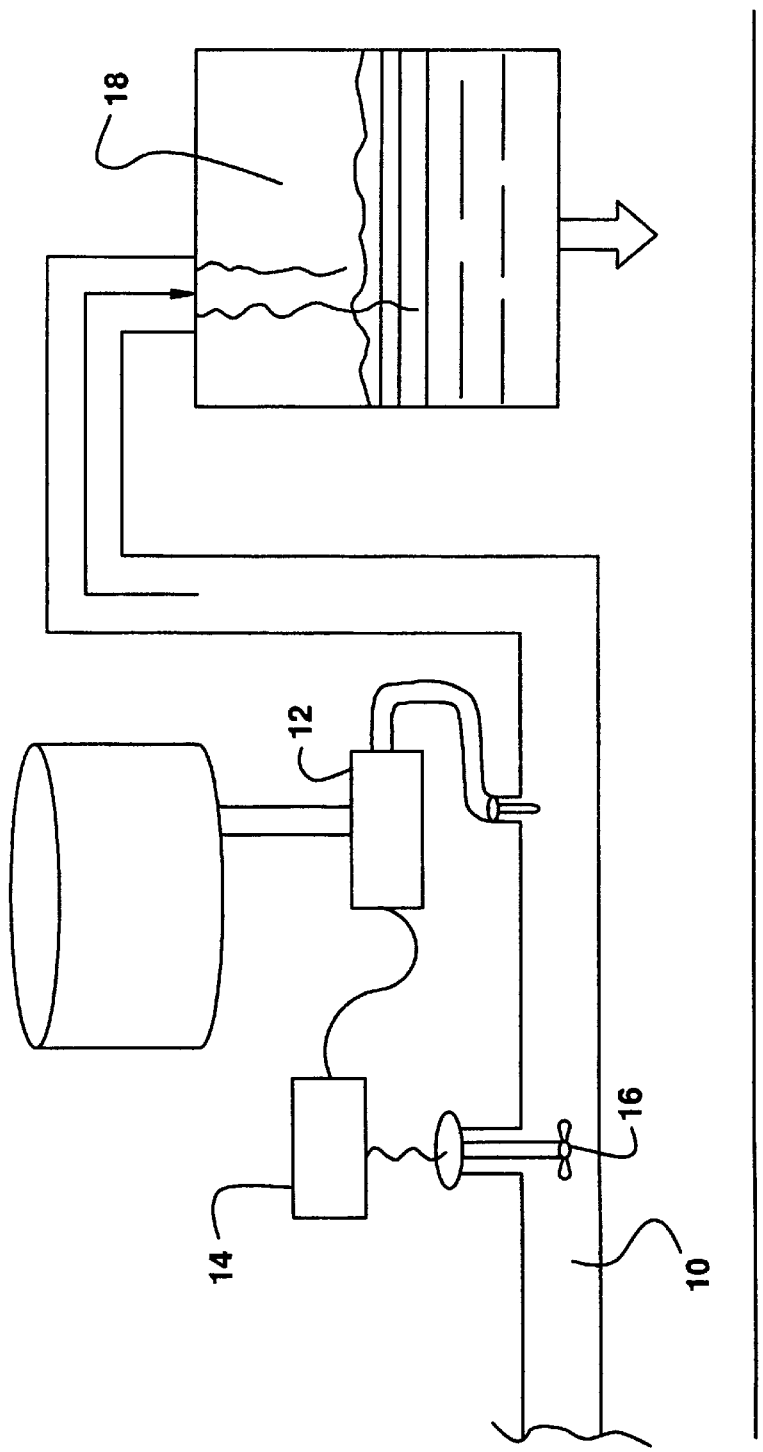
FIG. 1 is a schematic diagram of an arrangement of equipment for dosing water.

As noted above, the invention relates to a novel, aqueous, dust suppression fluid comprising one or more surfactants and at least one high terpene-containing natural oil. Process water can be dosed with the fluid to provide a coal dust suppression formulation. Coal dust is contacted with the formulation for the abatement of coal dust. The present formulation can be added to solutions intended to be applied to road surfaces for dust suppression. The solutions can be applied by any methodology known in the art, for example, by roadside sprays and/or tanker trucks.

High terpene-containing natural oil as used herein is defined as those natural oils having a terpene content of at least 50%. It is preferable that the high terpene-containing natural oil contain at least 90% terpenes.

Suitable high terpene-containing natural oils include the citrus peel oils, preferably orange oil, grapefruit oil and lemon oil. Of these, orange oil is the most preferred as it contains about 90 to 94% terpenes and is very abundant in certain parts of the world. Pine oil is also a useful high terpene-containing natural oil.

Generally, the dust suppression fluid will contain about 1 to about 15% by weight high terpene-containing natural oils, preferably about 8 to about 12% by weight, and more preferably about 8 to about 10% by weight. Naturally, the amount of high terpene-containing natural oils will depend upon the amount of terpenes in the oil. For example, in the case of the preferred embodiment, orange oil, the oil can be added in an amount of from 1 to about 15% by weight, although it is preferably added in an amount of about 8 to about 10% by weight.

While not wishing to be bound by theory, it is believed that the terpenes in the natural oils provide the mechanism for obtaining many of the objects of the invention. For example, the terpenes are believed to break up oily (fatty) deposits on the coal that tend to clog spray nozzles and scrubber screens. Furthermore, the terpenes are believed to break up fatty layers on coal particles allowing the water droplets to better wet the coal particles. When used as a wetting enhancement agent, it is believed that the present formulation acts by causing a decreased surface tension in the aqueous solutions in which it is included. When applied to hard packed surfaces, such as road surfaces common in construction and mining sites, the resulting solution is able to penetrate the surfaces more effectively than the formulations of the prior art. Once the solution evaporates, basic salts used in the formulation remain. Constant re-wetting and evaporation leads to an accumulation of these salts and results in improved wetting and water retention. The inclusion of a humectant in the present formulation further improves the water retention characteristics of surfaces treated with the present invention.

In addition, because the high terpene content oils are natural oils, environmentally acceptable products are being used to dose the process water, thereby reducing process water contamination. With respect to at least orange oil, it is also believed that this oil in combination with cleaned coal particles act as a liquid ionizer. This is seen from a reduction in total dissolved solids and suspended solids which remain in the process water. The biodegradable nature of the high terpene oils of the present invention prevents them from accumulating to unacceptable levels when they are included in road wetting solutions that are intended to be repeatedly applied.

The aqueous, dust suppression fluid of the invention also contains at least one surfactant. Generally, conventional surfactants used in dust abatement can be used such as anionic, and nonionic surfactants. Preferred are anionic surfactants such as salts of fatty acids, alkyl sulphates, alkyl ether sulphonates, alkyl ether sulphates, and alkyl aryl sulphonates. Examples of preferred surfactants include sodium dodecyl benzene sulphonate, sodium lauryl ether sulphate and salts such as sodium salts of secondary alkane sulphonates (e.g., Hostaspun SAS 70 marketed by Hoechst). Preferred nonionic surfactants are ethoxylated linear alcohols with 7–9 moles of ethylene oxide. Alkyl aryl sulphonates will customarily be used in a range of about 5% to about 15% and most preferably will be used in the range of about 9%–12%. Alkyl ether sulphonates and sulphates will be used in the range of about 2%–10% and most preferably will be used in the range of about 4% to about 6%. Alkyl sulphates and sulphonates will be used in the range of about 0.1% to about 5% and most preferably in the range of about 1% to about 2%. Ethoxylated linear alcohols will be used in the range of about 1% to about 10% and most preferably in the range of about 2% to about 5%. The final composition of the aqueous dust suppression fluid can be adjusted to suit the requirements of each particular environment.

Generally, a large portion of the aqueous dust suppression fluid will comprise surfactants. For example, the fluid can contain up to about 40% by weight surfactant(s), preferably from about 15 to about 25% by weight surfactant(s), and more preferably about 20 to about 22% by weight.

The dust control composition of the invention may contain a variety of additives such as antioxidants, preservatives and humectants. An example of a suitable antioxidant is BHT (2,6-di-tert-butyl-para-cresol). The antioxidant(s) may be added to the composition in an amount of 0.01 to 1% by weight, preferably 0.08 to 0.12% by weight.

Examples of suitable preservatives include formaldehyde, methylparaben, propylparaben, borax, and mixtures thereof. The preservatives may be added to the composition in an amount of 0.5 to 5% by weight, preferably 0.8 to 1.2% by weight.

An example of a suitable humectant is polyglycol. The humectant may be added to the present composition in an amount of 0.5–5% by weight and preferably in an amount of about 1% to about 3%. In a preferred embodiment, all other ingredients of the formulation are mixed and water added to the final volume. Polyglycol is then added at an amount equal to 2% by weight of the final volume resulting in a polyglycol concentration somewhat below the nominal value of 2%.

Since the dust suppression fluid is an aqueous composition, the balance of the composition will be water. Typically, the fluid will contain from about 66 to about 70% by weight water.

An example of an effective dust control fluid comprises 10.95% sodium dodecyl benzene sulphonate, 5.1% sodium lauryl ether sulphate, 9.1% cold pressed orange oil, 3.5% ethoxylated linear alcohols, 1.4% of the sodium salt of a secondary alkane sulphonate, 1.0% formaldehyde, 2% polyglycol, and 0.1% of an antioxidant, with the balance being water (all percentages are by weight).

When used in coal mining applications, process water will be dosed with the coal dust suppression fluid to provide a coal dust abatement formulation. Typically, process water can be dosed with the fluid at a weight ratio of about 3000:1 up to about 15000:1 (water/fluid) to provide an effective formulation for the reduction in airborne dust. More preferably, process water can be dosed with the fluid at a weight ratio of about 7000:1 up to about 9000:1.

The dust suppression fluid can be injected into a main column of process water pumped into the coal mine. The process water can be pumped by an electronically controlled pump. The metering pump can be controlled by a flow meter and control box measuring the amount of flow. The dosed process water can then be directed as needed, to various parts of the mine for dust suppression.

When used for dust suppression and wetting of roads and other surfaces, the formulation may be mixed at a ratio of about 1:1,000 to about 1:15,000, preferably from about 1:2,000 to about 1:12,000, more preferably from about 1:3,000 to about 1:7,000 and most preferably at about 1:5,000. As shown in FIG. 1, the mixing is accomplished by directly injecting the formulation into the water line 10 that contains the main flow of water. The rate of injection is adjusted by a computer-controlled variable dosage pump 12.

The computer 14 monitors the flow rate in the pipe by means of a flow paddle 16 and adjusts the dose of the injected dust suppression formulation so as to maintain a constant ratio of formulation:water. After mixing, the dosed water may be directly dispensed into water tankers. In other embodiments, the dosed water may be accumulated in storage tanks 18 for later use or directed into a spray system installed along the surface to be treated. The ratio of dust suppression formulation:water will be adjusted as required. For example, initial treatments of a surface may contain a higher concentration of dust control formulation (i.e a ratio of 1:2,000 to 1:5,000 formulation:water) than subsequent maintenance treatments (i.e. a ratio of 1:7,000–1:12,000 formulation:water).

Another aspect of the invention provides a mechanism for dewatering coal. Once coal has been mined, it is typically sent to a preparation plant. In preparation plants, coal is sorted by various methods, such as by changing the specific gravity of fluids in which the coal is dumped. By raising or lowering of the specific gravity of those fluids, various qualities of coal can be sorted by the coal specific gravity. After the coal has been sorted, it is washed.

Among other things, process water is also removed from the coal in the preparation plants. The removal of water from the coal product in the preparation plant is one of the most economically significant steps in coal cleaning. That is, efficient dewatering is critical to ensure contract compliance, minimize transportation costs, and reduce coal handling problems, especially with respect to water freezing in storage vessels and rail cars.

There have been many mechanical techniques such as filtration and centrifugation which have been used to remove process water in preparation plants. Also, chemical techniques have been used to dewater coal. For example, surface active agents have been used to reduce water surface tension and enhance water removal from coal products.

The present invention unexpectedly provides a novel composition which can enhance water removal from mined coal products. As a chemical technique for removing water from coal at a preparation plant, the composition can be used, for example, in disc or drum filtration applications by feeding the composition directly to a slurry entering a filter vat. Or, a solution of the composition can be sprayed directly on a filter cake. Centrifugal dryer feed can be readily treated by spraying a solution of the composition onto the coal as it discharges from dewatering screens, etc.

In another and preferred embodiment of the invention, the composition can be added to the wash water. As the wash water will then have a substantially reduced surface tension, less will remain with the coal after washing. For example, by using this technique 96%, instead of 94% coal per ton of freight could be obtained for larger sizes, and 88% coal rather than 84% coal for fine coal. In a broad sense, by dosing wash water by about 7 to 50 grams per metric ton of coal to be washed with the composition according to the invention a 30 to 70% reduction in water content can be provided.

As a particularly effective embodiment of the invention, the composition can be used both in a preparation plant for dewatering applications, and for coal dust suppression. For example, dust abatement water dosed with the dust suppression fluid of the invention can also be used in preparation plant dewatering if run-off water is used.

While the invention has been described above with respect to certain particular embodiments thereof, numerous other forms and modifications will be apparent to those skilled in the art. The appended claims and the invention generally should be construed as covering all such obvious forms and modifications which are within the true spirit and scope of the invention.

What is claimed is:

1. A method for the enhancement of wetting of a surface comprising the steps of:
   (1) dosing water with an aqueous solution consisting essentially of about 15% to about 25% by weight anionic surfactant selected from the group consisting of fatty acids, alkyl sulfates, alkyl ether sulphonates, alkyl ether sulfates, alkyl aryl sulphonates and mixtures thereof;, about 1% to about 10% by weight nonionic surfactant selected from the group consisting of ethoxylated linear alcohols, 0.5% to 5% by weight humectant and about 1% to about 15% by weight high terpene content natural oil to prepare a formulation;
   (2) applying said formulation to said surface; and
   (3) drying said surface.

2. A method according to claim 1, wherein said anionic surfactant consists of sodium dodecyl benzene sulphonate, sodium lauryl ether sulphate, and the sodium salt of a secondary alkyl sulphate.

3. A method according to claim 2, wherein the high terpene content natural oil(s) is/are citrus peel oil(s) and is/are selected from the group consisting of orange oil, lemon oil and grapefruit oil.

4. A method according to claim 3, wherein the citrus peel oil is orange oil.

5. A method according to claim 4, wherein the water is dosed in a range of about 1 part aqueous solution to 1,000 parts water to 1 part aqueous solution to 15,000 parts water.

6. A method according to claim 5, wherein the water is dosed in a range of about 1 part aqueous solution to 2,000 parts water to 1 part aqueous solution to 12,000 parts water.

7. A method according to claim 6, wherein the water is dosed in a range of about 1 part aqueous solution to 3,000 parts water to 1 part aqueous solution to 7,000 parts water.

8. A method according to claim 1, wherein said humectant is polyglycol, and wherein said anionic surfactant component consists of sodium dodecyl benzene sulphonate, sodium lauryl ether sulphate, and the sodium salt of a secondary alkyl sulphate.

9. A method according to claim 8, wherein the high terpene content natural oil(s) is/are citrus peel oil(s) and is/are selected from the group consisting of orange oil, lemon oil and grapefruit oil.

10. A method according to claim 9, wherein the citrus peel oil is orange oil.

11. A method according to claim 10, wherein the water is dosed in a range of about 1 part aqueous solution to 1,000 parts water to 1 part aqueous solution to 15,000 parts water.

12. A method according to claim 11, wherein the water is dosed in a range of about 1 part aqueous solution to 2,000 parts water to 1 part aqueous solution to 12,000 parts water.

13. A method according to claim 12, wherein the water is dosed in a range of about 1 part aqueous solution to 3,000 parts water to 1 part aqueous solution to 7,000 parts water.

14. A method for the enhancement of wetting of a surface comprising the steps of:
   (1) dosing water with an aqueous solution consisting essentially of about 15% to about 25% by weight anionic surfactant selected from the group consisting of fatty acids, alkyl sulfates, alkyl ether sulphonates, alkyl ether sulfates, alkyl aryl sulphonates and mixtures thereof;, about 1% to about 10% by weight nonionic surfactant selected from the group consisting of ethoxylated linear alcohols, 0.5% to about 5% by weight humectant and about 1% to about 15% by weight high terpene content natural oil to prepare a formulation;
   (2) applying said formulation to said surface;
   (3) drying said surface; and
   (4) repeating steps 1–3 one or more times.

15. A method according to claim 14, wherein said anionic surfactant consists of dodecyl benzene sulphonate, sodium lauryl ether sulphate, and the sodium salt of a secondary alkyl sulphate.

16. A method according to claim 15, wherein the high terpene content natural oil(s) is/are citrus peel oil(s) and is/are selected from the group consisting of orange oil, lemon oil and grapefruit oil.

17. A method according to claim 16, wherein the citrus peel oil is orange oil.

18. A method according to claim 17, wherein the water is dosed in a range of about 1 part aqueous solution to 1,000 parts water to 1 part aqueous solution to 15,000 parts water.

19. A method according to claim 18, wherein the water is dosed in a range of about 1 part aqueous solution to 2,000 parts water to 1 part aqueous solution to 12,000 parts water.

20. A method according to claim 19, wherein the water is dosed in a range of about 1 part aqueous solution to 3,000 parts water to 1 part aqueous solution to 7,000 parts water.

21. A method according to claim 14, wherein said humectant is consists of polyglycol, and said anionic surfactant comprises dodecyl benzene sulphonate, sodium lauryl ether sulphate, and the sodium salt of a secondary alkyl sulphate.

22. A method according to claim 21, wherein the high terpene content natural oil(s) is/are citrus peel oil(s) and is/are selected from the group consisting of orange oil, lemon oil and grapefruit oil.

23. A method according to claim 22, wherein the citrus peel oil is orange oil.

24. A method according to claim 23, wherein the water is dosed in a range of about 1 part aqueous solution to 1,000 parts water to 1 part aqueous solution to 15,000 parts water.

25. A method according to claim 24, wherein the water is dosed in a range of about 1 part aqueous solution to 2,000 parts water to 1 part aqueous solution to 12,000 parts water.

26. A method according to claim 25, wherein the water is dosed in a range of about 1 part aqueous solution to 3,000 parts water to 1 part aqueous solution to 7,000 parts water.

27. A method according to claim 18, comprising:
   (1) a first application of said formulation wherein said formulation contains from about 1 part aqueous solution to 1,000 parts water to 1 part aqueous solution to 5,000 parts water; and
   (2) one or more subsequent applications of a formulation that contains less of the aqueous solution than was used in the first application.

28. A method according to claim 27, wherein said subsequent applications comprise the application of a formulation comprising from about 1 part aqueous solution to 7,000 parts water to 1 part aqueous solution to 12,000 parts water.

29. A method according to claim 28 comprising:
   a first application comprising the application of a formulation comprising about 1 part aqueous solution to 5,000 parts water; and
   at least one subsequent application of a formulation comprising from about 1 part aqueous solution to 7,000 parts water to about 1 part aqueous solution to 10,000 parts water.

30. A method according to claim 24, comprising:
   (1) a first application of said formulation wherein said formulation contains from about 1 part aqueous solution to 1,000 parts water to 1 part aqueous solution to 5,000 parts water; and (2) one or more subsequent applications of a formulation that contains less of the aqueous solution than was used in the first application.

31. A method according to claim 30, wherein said subsequent applications comprise the application of a formulation comprising from about 1 part aqueous solution to 7,000 parts water to 1 part aqueous solution to 12,000 parts water.

32. A method according to claim 31 comprising:

a first application comprising the application of a formulation comprising about 1 part aqueous solution to 5,000 parts water; and at least one subsequent application of a formulation comprising from about 1 part aqueous solution of 7,000 parts water to about 1 part aqueous solution to 10,000 parts water.

33. A method according to claim 2, wherein the humectant is polyglycol.

34. A method according to claim 14, wherein the humectant is polyglycol.

* * * * *